United States Patent
Sharma

(10) Patent No.: US 8,256,235 B2
(45) Date of Patent: Sep. 4, 2012

(54) APPARATUS AND METHOD FOR TRANSFERRING HEAT

(75) Inventor: Sunil Dutt Sharma, Beecroft (AU)

(73) Assignee: Commonwealth Scientific and Industrial Research Organisation (AU)

(*) Notice: Subject to any disclaimer, the term of this patent is extended or adjusted under 35 U.S.C. 154(b) by 455 days.

(21) Appl. No.: 12/530,322

(22) PCT Filed: Mar. 10, 2008

(86) PCT No.: PCT/AU2008/000328
§ 371 (c)(1),
(2), (4) Date: Oct. 20, 2009

(87) PCT Pub. No.: WO2008/109937
PCT Pub. Date: Sep. 18, 2008

(65) Prior Publication Data
US 2010/0044012 A1    Feb. 25, 2010

(30) Foreign Application Priority Data

Mar. 9, 2007  (AU) .............................. 2007901232
May 11, 2007  (AU) .............................. 2007902515

(51) Int. Cl.
*F25B 17/00* (2006.01)
(52) U.S. Cl. .......................................... 62/106; 62/476
(58) Field of Classification Search .................. 62/106, 62/107, 476, 482, 487; 165/104.19, 168, 165/185
See application file for complete search history.

(56) References Cited

U.S. PATENT DOCUMENTS

| 4,125,122 A | * | 11/1978 | Stachurski | 136/205 |
| 4,177,858 A | * | 12/1979 | Daman et al. | 165/11.1 |
| 4,245,380 A | * | 1/1981 | Maxson | 29/890.032 |
| 4,448,242 A | * | 5/1984 | Andres et al. | 165/104.14 |
| 4,513,732 A | * | 4/1985 | Feldman, Jr. | 126/570 |
| 4,756,164 A | * | 7/1988 | James et al. | 62/119 |
| 4,800,952 A | * | 1/1989 | Kirpich | 165/104.11 |
| 5,400,607 A | * | 3/1995 | Cayce | 62/90 |
| 5,404,938 A | * | 4/1995 | Dinh | 165/113 |
| 5,477,706 A |   | 12/1995 | Kirol et al. |   |

(Continued)

FOREIGN PATENT DOCUMENTS
WO   WO 2005/073644 A1   8/2005

OTHER PUBLICATIONS
International Search Report for PCT Application No. PCT/AU2008/000328, 2 pages, Apr. 29, 2008.

(Continued)

*Primary Examiner* — Mohammad Ali
(74) *Attorney, Agent, or Firm* — Brinks Hofer Gilson & Lione

(57) ABSTRACT

A heat transfer apparatus and method comprises first and second heat transfer units. A heat exchanger has a first portion thereof arranged between the first and second units, and a second portion that is thermally connected to the first portion and not arranged between the first and second units. Each heat transfer unit comprises one or more modules, and each module comprises a chamber having a first part which contains a first gas adsorbent material and a second part which contains a second gas adsorbent material. These parts are connected so as to allow gaseous communication therebetween whilst being relatively thermally isolated from each other.

21 Claims, 7 Drawing Sheets

U.S. PATENT DOCUMENTS

| | | | |
|---|---|---|---|
| 5,522,228 A | 6/1996 | Guillot et al. | |
| 6,318,106 B1 * | 11/2001 | Maeda | 62/271 |
| 6,370,908 B1 * | 4/2002 | James | 62/434 |
| 7,081,699 B2 * | 7/2006 | Keolian et al. | 310/311 |
| 7,524,343 B2 * | 4/2009 | Deshpande | 48/127.9 |

OTHER PUBLICATIONS

International Preliminary Report on Patentability and Written Opinion for PCT Application No. PCT/AU2008/000328, 4 pages, Sep. 15, 2009.

* cited by examiner

Figure 1. Desorption Chiller Module

Typical average temperature profile across the regenerator during a Cycle of heating and cooling

FIG. 5
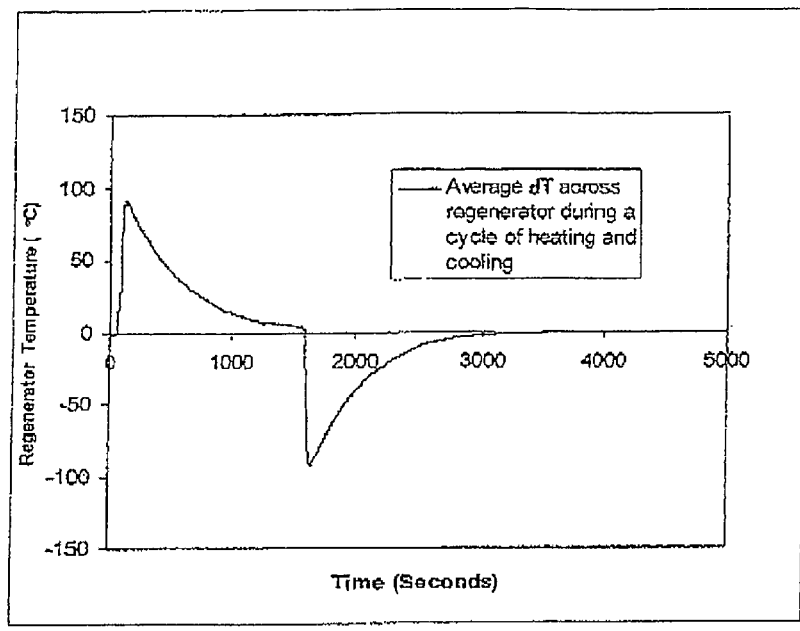
Average temperature gradient across the regenerator during a cycle of heating and cooling
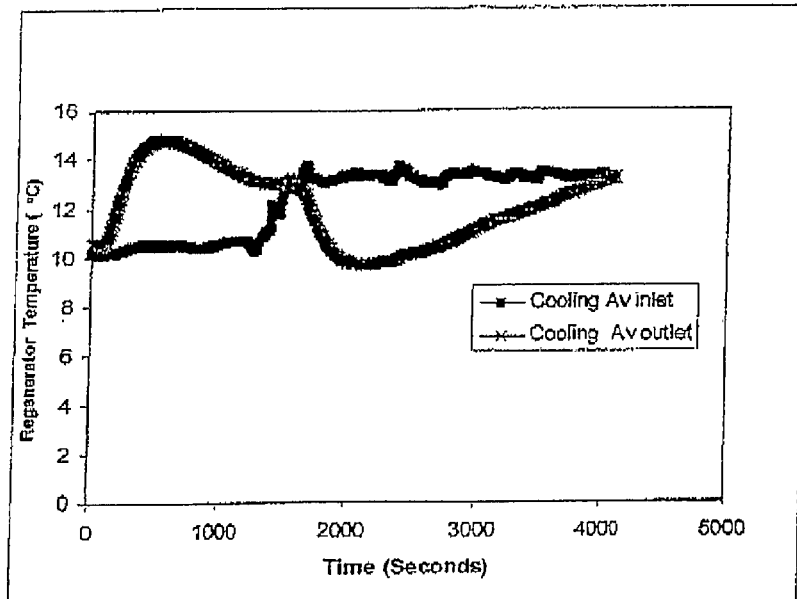
Average temperature profile of cooling air in the cooler side (Change in inlet air temperature was deliberate to get cooling from 3°C.)
FIG. 6

FIG. 7
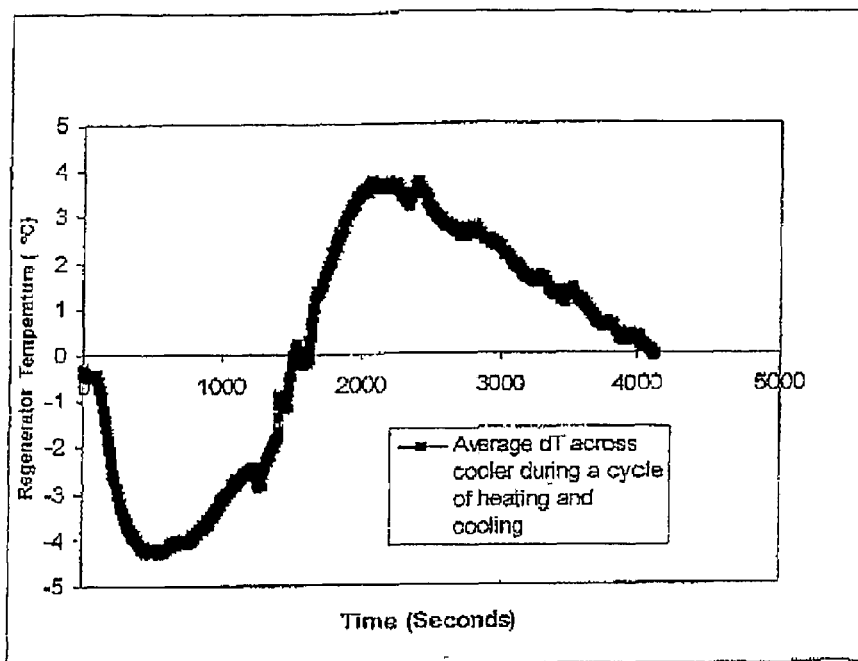
Temperature gradient of cooling air across the cooler side
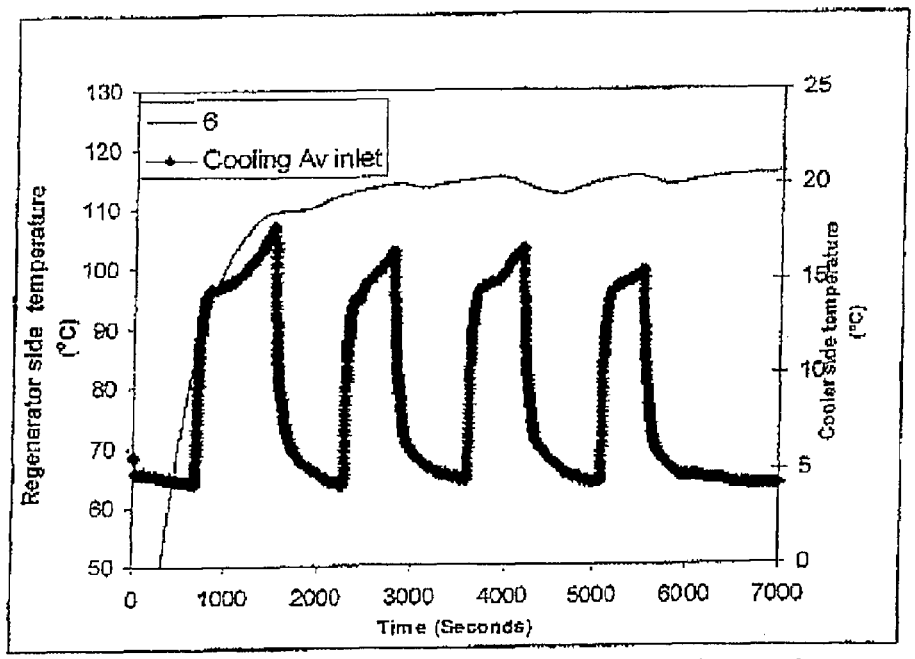
Experimental evidence of additional heat generation at the regenerator when cold air is produced at the cooling side (when the cooling side is heated)
FIG. 8

Air exit temperature profile when regenerator is cooled

APPARATUS AND METHOD FOR TRANSFERRING HEAT

This application is a filing under 35 U.S.C. §371 of International Patent Application PCT/AU2008/000328, filed Mar. 10, 2008, which claims priority to Australian Application No. 2007901232, filed Mar. 9, 2007, and Australian Application No. 2007902515, filed May 11, 2007.

TECHNICAL FIELD

An improved apparatus and method for transferring heat is disclosed. Whilst the improved apparatus and method can be embodied as a desorption cooler, using the heat of one fluid (gas or liquid) to cool another fluid, the apparatus and method can be applied in a broad range of industries and contexts. Further, the apparatus and method can be applied in reverse, to enhance the cooling of a heated fluid.

BACKGROUND ART

Many industries discharge warm and hot process and waste gases to atmosphere such that the heat energy is lost. This can also result in a contribution to atmospheric warming. Warm liquids such as waste waters can also be released to the environment. It would be desirable if some of this wasted heat energy could be captured and utilised in that industry or elsewhere.

Attempts have been made to develop systems for capturing waste heat. For example, U.S. Pat. No. 5,522,228 discloses apparatus for the production of cold by the adsorption and desorption of carbon dioxide. WO 2005/073644 (to the present applicant) discloses a method, apparatus and system for transferring heat which can be embodied as an adsorption chiller that employs a simple modular design principle.

However, the most significant hurdle to commercialisation currently being experienced with waste heat-driven chillers relates to the achievement of a satisfactory coefficient of performance (COP). Whilst the adsorption chiller of WO 2005/073644 may have a theoretically estimated maximum COP of close to 0.6, in practice a maximum COP of about 0.4 has been achieved.

Known gas fired, solar and waste heat driven coolers can be compression cycle, LiBr-water absorption or silica gel-water adsorption based. The compression cycle chillers use hydrofluoro carbons (HFCs) as a working fluid and can achieve a maximum overall COP of about 1, based on 30% efficiency of the prime mover which drives the compressor of the compression cycle which has a COP of around 3.5. Compression cycles have many moving parts, especially with the use of a gas engine as prime mover. The maintenance requirement of these systems is typically higher as compared to electrically driven systems. Also HFC is a green house gas which must be phased out by 2020. On the other hand, known absorption and adsorption systems have a COP of up to 0.9 but have severe corrosion and maintenance issues. Both absorption and adsorption systems use cooling towers to supply cold water for condensing the refrigerant vapours.

By employing in a single stage, lithium bromide, a COP of 0.4 has been practically possible and a higher COP of up to 1.5 possible with a so-called triple effect system. However, these latter systems require additional heat exchangers, higher regeneration temperatures and a complicated flow scheme. A triple effect system also has higher capital costs and maintenance requirements as compared to a single effect system.

The compression cycle has dominated direct gas fired refrigeration as well as the electrically driven refrigeration markets, purely because of its higher COP. High COP can therefore be considered as the main criteria for the commercial success of any alternative cooling system. A current benchmark COP for the compression cycle is 3.5, and no waste heat-driven coolers have to date been able to achieve anything approaching a COP of 3.5.

It is to be understood that references to prior art information herein do not constitute an admission that the information forms part of the common general knowledge of a person of ordinary skill in the art in Australia or in any other country.

SUMMARY OF THE DISCLOSURE

In a first aspect there is provided heat transfer apparatus comprising first and second heat transfer units, and a heat exchanger that has a first portion thereof arranged between the first and second units, with a heat exchanger second portion being thermally connected to the first portion and being not so arranged, wherein each unit comprises one or more modules, with each module comprising a chamber having a first part which contains a first gas adsorbent material and a second part which contains a second gas adsorbent material, with the parts being connected so as to allow gaseous communication therebetween whilst being relatively thermally isolated from each other.

As explained in greater detail herein, such an apparatus can be operated in a heat accumulation mode, and this can provide the potential to achieve a COP of up to 12 in certain applications. More specifically, a high COP can be achieved by accumulating rejected heat in the regenerating parts of the modules.

Further, as compared to triple effect systems, the apparatus does not require additional heat exchangers, and does not require pumps or other like apparatus because each module can itself act as a heat accumulation device.

In the heat accumulation mode, a hot fluid stream (eg. a waste or process gas or liquid) can be continuously passed through the heat exchanger second portion, enabling the accumulation into the apparatus of this heat. As explained in greater detail herein, the apparatus can then be operated such that adsorption/desorption is alternately and simultaneously taking place (ie. in parallel) in the first and second units, thereby enabling the continuous output of a cooled fluid stream. This can be achieved with apparatus and operating simplifications, so that efficiency improvements follow.

Also, operation of the apparatus can be commenced at ambient temperatures and does not require an external cooling source.

In this specification, the expression "relatively thermally isolated" is intended to mean that the first and second adsorbent materials are sufficiently thermally isolated such that one can be heated or cooled without affecting the other to an extent that prevents a required/desired cooling desorption (or the reverse) from being attained. In addition, thermal isolation can be enhanced by spacing and/or insulating the first and second adsorbent materials from each other.

In one form the heat exchanger first portion is arranged between the module first part(s) of each unit, but is not so arranged between the module second part(s) of each unit.

In one embodiment the heat exchanger is of a shell and tube type, having a plurality of heat tubes extending in the shell, with the shell and tubes extending between the first and second portions to enable said thermal connection. For example, each tube can house a fluid (such as water etc) to enhance the thermal connection between the second and first portions.

Also, a partition can be provided within the shell that defines the first and second portions, but through which the tubes extend to enable the thermal connection.

The term "thermal connection" is to be interpreted to embrace a broad range of heat transferral mechanisms, as would be understood by a person of ordinary skill in the art.

In one form, each heat transfer unit comprises a plurality of modules. Each unit may also comprise a partition within the unit through which the modules extend such that the first part is located on one side of the unit partition and the second part is located on an opposite side of the unit partition. This can again enhance thermal isolation.

For example, the first and second parts of each module can be joined by a section which is adapted to minimise conductive heat transfer between the first and second portions whilst allowing the continuous gaseous communication between the portions, the section being a conduit having a relatively smaller width than the width of the first and second chamber parts adjacent thereto.

In one form the first and second materials are each packed into a respective module part. In this regard, the first gas adsorbent material typically has a different adsorptivity to the second gas adsorbent material. For example, the first gas adsorbent material can comprise a different material to the second gas adsorbent material; eg. the first gas adsorbent material can be a zeolite, and the second gas adsorbent material can be activated carbon.

In this one form, each module chamber can contain a gas that can adsorb onto and desorb from the first and second materials. For example, the gas can be carbon dioxide that is pressurised relative to ambient pressure. A typical operating pressure for the gas can be around 0.5 MPa.

In use, the heat exchanger can be adapted to receive a first fluid flow through the second portion but so as not to flow through the first portion. Further, in use the apparatus can be adapted to receive a working fluid flow through the first and second units, around the module first part(s) of each unit, and via the heat exchanger first portion. It can be further adapted to receive a second fluid flow through the first and second units, around the module second part(s) of each unit.

For example, when in use the first fluid is a relatively hot fluid, the apparatus can be operated such that the second fluid can be cooled as it flows around the module second part(s) of each unit. Thus, the apparatus can be embodied to function as a desorption cooler.

In a second aspect there is provided a method for transferring heat using the apparatus of the first aspect. The method comprises the steps of:

(i) passing a relatively hot fluid through the heat exchanger second portion whereby the thermal connection to the first portion causes heat to be transferred to the first portion;

(ii) passing a relatively cooler first working fluid through the second unit and around the module first part(s) therein, then through the heat exchanger first portion to be heated up by the heat transferred thereto in step (i), then through the first unit and around the module first part(s) therein, to heat those parts and cause gas adsorbed on the first material to desorb and flow to the module second part(s) in the first unit to adsorb onto the second material, the first working fluid then exiting the first unit;

(iii) ceasing the flow of the first working fluid and passing another relatively cooler second working fluid through the first unit and around the module first part(s) therein to cool those part(s) and cause gas adsorbed on the second material to desorb and flow back to the module first part(s) in the first unit and adsorb back onto the first material;

(iv) whilst passing the second working fluid through the first unit and causing said desorption in step (iii), passing a first feed fluid through the first unit and around the module second part(s) therein, whereby the desorption of gas from the second material causes the first feed fluid to be cooled, which cooled fluid can then exit the first unit.

In one form, in step (iii), after the second working fluid has passed around the module first part(s), it is then passed through the heat exchanger first portion to be heated up by the heat of step (i) that is being transferred thereto, and is passed through the second unit and around the module first part(s) therein, to heat those parts and cause gas adsorbed on the first material to desorb and flow to the module second part(s) in the second unit to adsorb onto the second material, with the second working fluid then exiting the second unit.

To provide for continuous operation, and to enable the apparatus to be operated in the heat accumulation mode, the method can comprise the further steps of:

(v) ceasing the flow of the second working fluid and passing the first working fluid through the second unit and around the module first part(s) therein to cool those part(s) and cause gas adsorbed on the second material to desorb and flow back to the module first part(s) in the second unit and adsorb back onto the first material;

(vi) whilst passing the first working fluid through the second unit and causing said desorption in (v), passing a second feed fluid through the second unit and around the module second part(s) therein, whereby the desorption of gas from the second material causes the second feed fluid to be cooled, which cooled fluid can then exit the second unit.

As part of the continuous operation, and again, to enable the apparatus to be operated in the heat accumulation mode, the first and second feed fluids can be continuously passed through the first and second units, and the passing of the relatively hot fluid through the heat exchanger second portion of step (i) can be continuously maintained.

Also, once the method is up and running, each working fluid is heated by heat transfer from a respective set of first module parts prior to passing into the heat exchanger first portion. Also, when not being desorption cooled, one of the feed fluid streams is cooling a respective set of second module parts and is then being exhausted. This, configuration contributes to heat accumulation to enable the COP to be increased.

In one form, the first and second feed fluids exiting the first and second units can each be passed to a respective entry of a four-way valve. The four-way valve can further comprise both an exhaust port and a cooled fluid exhaust port whereby, over a given interval, the cooled fluid of the first and second feed fluids is caused to exit the cooled fluid exhaust port, and the non-cooled fluid of the second and first feed fluids is caused to exit the exhaust port, respectively.

BRIEF DESCRIPTION OF THE DRAWINGS

Notwithstanding any other forms which may fall within the scope of the apparatus and method as set forth in the Summary, specific embodiments of the apparatus and method will now be described, by way of example only, and with reference to the accompanying drawings in which:

FIGS. 4 to 9 are various graphs plotting Regenerator Temperature against Time, at respectively different sides and stages in operation of the system of FIG. 2.

DETAILED DESCRIPTION OF SPECIFIC EMBODIMENTS

In a typical mode of use, the apparatus and method is used to transfer heat energy (eg. waste heat) from a gas or liquid steam to achieve a separate cooling purpose (eg. the cooling of another separate fluid stream).

Figure 1:
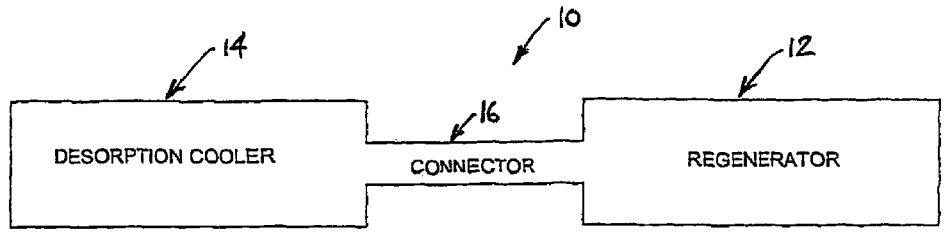
FIG. 1 shows a schematic view of a simple desorption chiller module for use in the apparatus and method.
Figure 2:
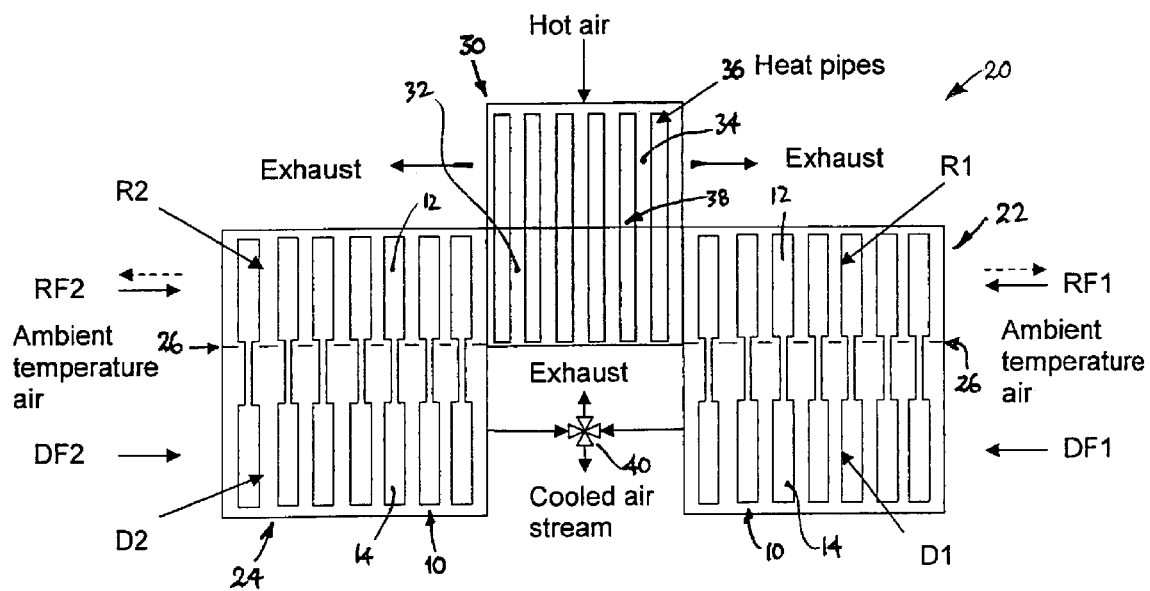
FIG. 2 shows a schematic view of a specific desorption cooling system according to the apparatus and method, the system employing a plurality of the desorption chiller modules of FIG. 1 in each of two parallel units.

Referring now to FIG. 1, a simple desorption chiller module for use in the system of FIG. 2 is depicted. The module 10 comprises a sealed vessel having two cylindrical chambers (eg. tubes, such as stainless steel tubes), being a regenerator chamber 12 and a desorption cooler chamber 14. The chambers are connected by a joining section in the form of a narrower (eg. smaller diameter) conduit or neck 16 (such as a smaller diameter tube). To provide for greater thermal isolation of the chambers 12, 14 the conduit 16 can be formed from a material having lesser thermal conductivity than the chamber walls (eg. a less thermally conductive stainless steel) and is typically welded to the chamber walls to seal the vessel 10.

Regenerator chamber 12 is packed with a first adsorbent material, typically in the form of a molecular sieve (eg. a zeolite such as a 13X zeolite) and the desorption cooler chamber 14 is packed with either a different second adsorbent material (eg. a surface activated powder such as activated carbon) or the same material but having a different adsorptivity (eg. another type of zeolite but having, for example, a lesser adsorptivity eg. 10A, 8A, 5A zeolites or another type of 13X zeolite).

One or more heat transfer elements in the form of a plurality of discrete metal wire mesh panels can be arranged in each of the chambers 12&14, together wit the first and second adsorbent materials (ie. the panels can be dispersed through the adsorbent material). The panels are typically formed from a material not reactive to the gas and materials in vessel 10, such as stainless steel, brass, aluminium or copper, and of a material having sufficient thermal conductivity. The panels function to enhance thermal conductivity between the adsorbent material and the wall and thus exterior of each chamber. In addition, the present inventor has surprisingly and advantageously discovered that the panels enhance the mass transfer rate of carbon dioxide through each of the first and second adsorbent materials.

The module sealed vessel 10 further comprises a suitable pressed gas, typically carbon dioxide because of its abundance and ease of use; but other gases can be used such as refrigerants, ammonia, alcohol, water (steam), nitrogen etc in combination with adsorbents suitable to the gas.

The module sealed vessel 10 is configured such that the gas can pass in a continuous and unhindered manner between each of the chambers 12, 14 via the conduit 16. No valving or additional flow control is provided or required and the sealed vessel has no moving parts. In addition, the module sealed vessel 10 is typically configured so that the desorption cooler chamber 14 (housing the second adsorbent material) is, at least to an operable extent thermally isolated from the regenerator chamber 12 (housing the first adsorbent material). This is optimally achieved by employing the narrower conduit 16 to connect but space apt the chambers. However, thermal isolation can be further enhanced by employing appropriately positioned insulation, including insulation barriers and baffles in, around and/or between the chambers.

In use, the first adsorbent material is selected to have a higher adsorptivity for the vessel gas then the second adsorbent material. Starting at ambient temperature, it is observed that a greater proportion or a bulk of the vessel gas is adsorbed on the first material. When the regenerator chamber 12 is contacted with a relatively hot fluid stream (eg. by arranging the regenerator chamber in the centre or midpoint of the hot stream) the first adsorbent material is heated. The hot gas stream can be passed over, around or even trough chamber 12 (eg. via one or more pipes/tubes extending through chamber 12). As the first material heats up, adsorbed gas (such as carbon dioxide) is desorbed therefrom and the gas pressure in the vessel increases. Because of the relative thermal isolation of the desorption cooler chamber 14, there is a driving force for the carbon dioxide to pass from chamber 12 into the chamber 14 via the conduit 16 and be adsorbed onto the relatively cooler second material (eg. activated carbon). During this adsorption the second material becomes slightly heated. The tendency of the gas to adsorb onto the second material can be enhanced by arranging the chamber 14 a cooling fluid stream (eg. in the centre or midpoint of a stream of ambient air) such that the second material is finer cooled relative to the first material.

The first material (such as a zeolite molecular Sieve) remains relatively heated whilst in thermal communication with the hot stream, so that there is no driving force for re-adsorption thereon of the gas in the module vessel 10. Thus, in a subsequent step, the regenerator chamber 12 is cooled (eg. by stopping or redirecting the flow of hot fluid). To filcher cool the chamber 12 a cooling fluid stream (eg. ambient air) can be passed therearound. As the chamber 12 cools, the first material cools and the pressure of carbon dioxide in the vessel is reduced. This then provides a driving force for gas to pass back to the regenerator chamber 12 and be re-adsorbed onto the first material. In this regard, the gas is desorbed from the second material and passes from chamber 14 via conduit 16 into chamber 12 and re-adsorbs onto the first material.

The desorption of the carbon dioxide from the second material in chamber 14 cools the second adsorbent material (ie. the gas needs to extract heat from the material during its desorption and to desorb) and thus cools the chamber 14 and the walls thereof. For example, the second chamber can be cooled by greater than 10° C. below ambient temperate as gas desorption progresses.

Cooler chamber 14 can be used, for example, to pre-cool a steam for eg. an engine or gas turbine, or to provide cooling air for air conditioning etc. In this way, a hot process fluid (eg. waste gas) can be used to cool another process fluid requiring or benefiting from cooling.

Referring now to FIG. 2, where like reference numerals are used to denote similar or like parts, a heat transfer apparatus in the for of desorption cooling system 20 is depicted. The depicted system can provide for continuous desorption cooling and heat accumulative regeneration of the desorption cooling modules.

The system 20 employs a plurality of the sealed desorption chiller vessels 10 of FIG. 1, the vessels arranged in parallel, in each of parallel module units 22 and 24. Further, each unit comprises a thermal barrier wall 26 positioned to divide unit 22 into a regenerator chamber R1 and desorption cooler chamber D1 and to divide unit 24 into a regenerator chamber R2 and desorption cooler chamber D2.

It will be seen that the regenerator chamber 12 of each module 10 also sits in a respective regenerator chamber R1 or R2, and the desorption cooler chamber 14 sits in a respective desorption cooler chamber D1 or D2. The conduit 16 of each module extends through a respective wall 26. Each barrier wall 26 thus enhances the thermal isolation of chambers 12 & 14, R1 & D1 and R2 & D2. Barrier wall 26 can also be formed from and/or lined with an insulating material.

A shell and tube heat exchanger 30 has a first section 32 that is positioned between the module units 22 and 24 as shown. The heat exchanger further comprises a second section 34 that is thermally connected to the first section, primarily via a plurality of beat tubes 36 that extend lengthwise in the shell through a partition wall 38 extending transversely within the shell, the wall 38 further defining the first and second sections.

The second section 34 extends away from the module units 22 and 24 as shown and is adapted to receive a flow of a (typically hot) fluid therethrough (as depicted by the arrows). The hot fluid is not permitted by wall 38 to flow through the first section 32. However, the heat of the fluid is transferred (primarily by convection) into the first section 32 via the heat tubes 36 (which typically each house a liquid with a high heat capacity (such as water)).

The system 20 is adapted to receive first and second working fluids therethrough that originate from first and second fans RF1 and RF2. In this regard, the working fluids can conveniently each comprise ambient air.

The working fluid flow from RF1 flows firstly through the first module unit 22, into the regenerator chamber R1 around the module regenerator chambers 12 therein, and then into the heat exchanger first section 32, to be heated by contacting the heat tubes 36. From there, the working fluid flows into the regenerator chamber R2 and transfers a bulk of its accumulated heat to the module regenerator chambers 12 arranged therein, before passing to exhaust (left hand dotted arrow).

Similarly, the working fluid flow from RF2 flows firstly through the second module unit 24, into the regenerator chamber R2 around the module regenerator chambers 12 therein, and then again into the heat exchanger first section 32, to be heated by contacting the heat tubes 36. Form there, the working fluid flows into the regenerator chamber R1 and transfers a bulk of its accumulated heat to the nodule regenerator chambers 12 arranged therein, before passing to exhaust (right hand dotted arrow).

The system 20 is further adapted to receive first and second feed fluids continuously therethrough that originate from third and fourth fans DF1 and DF2 (typically operated continuously). Again, the feed fluids can each comprise ambient air, but any other fluid (gas or liquid) to be cooled can comprise a feed fluid.

The feed fluid flow from DF1 flows through the first module unit 22, into the desorption cooler chamber D1 around the module desorption cooler chambers 14 therein, and then is exhausted to a four-way valve 40 arranged for selectively directing the fluid flows (as described below).

Similarly, the feed fluid flow from DF2 flows through the second module unit 24, into the desorption cooler chamber D2 around the module desorption cooler chambers 14 therein, and is again exhausted to the four-way valve 40.

The four-way valve 40 can be selectively operated to direct out the fluids from DF1 and DF2 ether as a cooled stream or to exhaust, depending on whether the stream entering the valve is in a cooled mode or cooling mode.

In this regard, in one typical method for transferring heat from a hot stream (depicted as "Hot air" in FIG. 2) the system 20 is operated as follows 1. The hot air is continuously passed through the heat exchanger second section 34 whereby the heat tubes' thermal connection to the first section 32 causes heat to be transferred thereto.

2. A relatively cool working fluid from RF1 (ie. ambient air at ambient temperatures) is passed into the regenerator chamber R1, flowing around tie module regenerator chambers 12 therein, and then into the heat exchanger first section 32, to be heated by contacting the heat tubes 36. From there, the working fluid flows into the regenerator chamber R2 and transfers a bulk of its accumulated beat to the module regenerator chambers 12 arranged therein, before passing to exhaust (left hand dotted arrow). The heat transferred to the regenerator chambers 12 in R2 causes gas (eg $CO_2$) adsorbed on the material in chambers 12 to desorb and flow to desorption cooler chambers 14 located in the desorption cooler chamber D2, the gas adsorbing onto the material in chambers 14.

3. The relatively cool working fluid from RF1 is stopped, and a relatively cool working fluid from RF2 (ie. ambient air at ambient temperatures) is now passed into the regenerator chamber R2, flowing around the module regenerator chambers 12 therein, and being somewhat heated thereby. The working fluid is then passed into the heat exchanger first section 32, to again be heated by contacting the heat tubes 36. From there, the working fluid flows into the regenerator chamber R1 and transfers a bulk of its accumulated heat to the module regenerator chambers 12 arranged therein, before passing to exhaust (right hand dotted arrow). Again, the heat transferred to the regenerator chambers 12 in R1 causes gas (eg. $CO_2$) adsorbed on the material in chambers 12 to desorb and flow to desorption cooler chambers 14 located in the desorption cooler chamber D1, the gas adsorbing onto the material in chambers 14.

4. As the working fluid originating from RF2 passes through the regenerator chamber R1 and causes the desorption in cooler chambers 14 located in D1, a feed fluid from DF1 is passed tough the desorption cooler chamber D1, flowing around the desorption cooler chambers 14 located therein, whereby the gas desorbing from the second material causes the feed fluid to be cooled, which cooled fluid then exits D1 and is passed to valve 40, to then be distributed as the "cooled air steam".

5. At the same time as the feed fluid from DF1 is passed through the desorption cooler chamber D1, a feed fluid from DF2 is passed through the desorption cooler chamber D2, flowing around tie desorption cooler chambers 14 located therein to cool them relative to the regenerator chambers 12 located in R2. Thus, the gas desorbing from the regenerator chambers 12 located in R1 passes into the desorption cooler chambers 14 in D2. The now slightly heated feed fluid that originated from DF2 exits D2 and is passed to valve 40, to then be distributed as the "Exhaust".

Non-limiting Examples of the system and operating method will now be described.

EXAMPLE 1

In this examples reference will be made to the system flow scheme of FIG. 2. The system had two identical units, 22 and 24, each housing an array of desorption modules. The regenerator ends were housed in the top regenerator chambers R1 and R2, whereas the desorbers were housed in the desorber (cooler) chambers, D1 and D2. In this unit an array of heat pipes was used to heat the regenerator ends of the desorption modules but other heater, beat exchanger or heat source was able to be used.

The heat delivery ends of the heat pipes were placed between R1 and R2. The heat absorbing ends of the array of beat pipes were directly exposed to the hot stream which entered from the top and exited from two sides to provide a symmetrical gradient of temperature across the heat pipe array. This symmetry was desirable to provide the same temperature profile to the heating streams for R1 and R2. The ambient air stream was alternately blown from outside fans RF1 and RF2 into R1 and R2 respectively as shown by the arrows. This was achieved by switching power supply to the blowers used for supplying the ambient temperature air. The system of FIG. 2 used air as a heating and cooling medium but any other fluid could be used.

In the desorber end side a four port two way valve was is placed between D1 and D2. The valve rotation was synchronised with the ambient air flow direction in the regenerator chamber to produce continuous cooling from the cooling system. The fans DF1 and DF2, which supplied ambient air to desorbers D1 and D2 respectively, were continuously operating.

The operation of the system was simpler than at shown in WO 2005/073644 with much less moving parts, and offered a much higher COP. To start the system, the heat pipes were continuously heated. At commencement, the chambers R1, R2, D1 and D2 were at ambient temperature. At time t=0, RF2 was started and pushed air through chamber R2 onto the heat pipes and was heated close to the regeneration temperature. The heated air from the heat pipes was then passed through R1, where it transferred over 95% of its heat on to the regenerator and was exhausted (as shown by the dotted arrow). The regenerators were designed to absorb almost all heat from the hot air. Therefore the temperature of the exhaust stream from R1 was a maximum 2-10° C. above the ambient temperature at the end of regeneration period (which lasted upto an hour or more, depending on the cooling capacity and COP required).

During the regeneration of R1, the desorber chamber D1 was cooled by the ambient air. After amber R1 reached the regeneration temperature, fan RF2 was turned off and RF1 was turned on. At this stage, the ambient air from the fan RF1 cooled down the chamber R1 and cooling of chamber D1 began and a changeover took place at the four way valve. Then D1 started producing cooled air and D2 was cooled by the ambient air from fan DF2.

At the regenerator side, the ambient air from the fan RF1 recovered heat from the chamber R1 and was preheated. On its passage through the beat pipes, the preheated air picked up the balance of the heat and passed through the regenerator R2. The regenerator 12 design was identical to X of R1 and therefore absorbed most of the heat from the hot air which exhausted at maximum 2-10° C. above the ambient temperature (dependent on the COP and cooling capacity on the unit).

The time cycle for the steady state operation is shown in Table 1.

TABLE 1

Steady State Time Cycle

| | Time (h) | | | |
|---|---|---|---|---|
| | 0  1 | 3 | 4 | 5 |
| RF1 | Off | On | Off | On |
| RF2 | On | Off | On | Off |
| DF1 | On | On | On | On |
| DF2 | On | On | On | On |
| R1 | Regenerating | Cooling | Regenerating | Cooling |
| R2 | Cooling | Regenerating | Cooling | Regenerating |
| D1 | Cooling from amb. air | Producing cooled air | Cooling from amb. air | Producing cooled air |
| D2 | Producing cooled air | Cooling from amb. air | Producing cooled air | Cooling from amb. air |
| V | Cold air from D2 Warm air from D1 | Cold air from D1 Warm air from D2 | Cold air from D2 Warm air from D1 | Cold air from D1 Warm air from D2 |

EXAMPLE 2

Concept of Smart Heat Accumulative Regeneration of Modular Array

Because the desorption cooler system was a modular design, where each module formed a part of a heat exchanger, an array of such modules was able to be used to trap a significant amount of high grade (>100° C.) as well as low grade (<50° C.) heat from the exhaust of a cooling regenerator. The adsorbents packed in the regenerator of the module offered a very high heat capacity plus the latent heat of desorption of adsorbate.

This feature of the regenerator enabled an effective absorption and accumulation of heat from the liquid or gas steam having a temperature as low as 2° C. above the regenerator temperature. Therefore, where a heated stream was passed through an array of regenerators of several desorption modules, effectively all heat from the stream could be extracted and accumulated in the regenerators.

It was noted that some of the heat was compensated by the latent beat of desorption which was not shown as any temperature rise, therefore heat transfer from the hot stream to the regenerator was able to be continued as long as desorption in the regenerator was not complete. When the desorption was complete then the regenerator acquired a temperature depending on the heat transfer coefficient, hot stream, temperature and heat capacity of the regenerator.

At this time the regenerators in the following rows of the array were still desorbing and absorbed the reminder heat in the hot stream. With a series of rows of modules almost all heat from the hot stream could be extracted. It was noted that if modules in the arrays were replaced by ordinary tubes with no desorption, the number of tubes required would be infinite for the complete extraction of the beat. Due to the desorption process in the regenerator of cooling modules, the number of rows in the array was much less for about 95% extraction of heat froin the hot steam.

Figure 3:
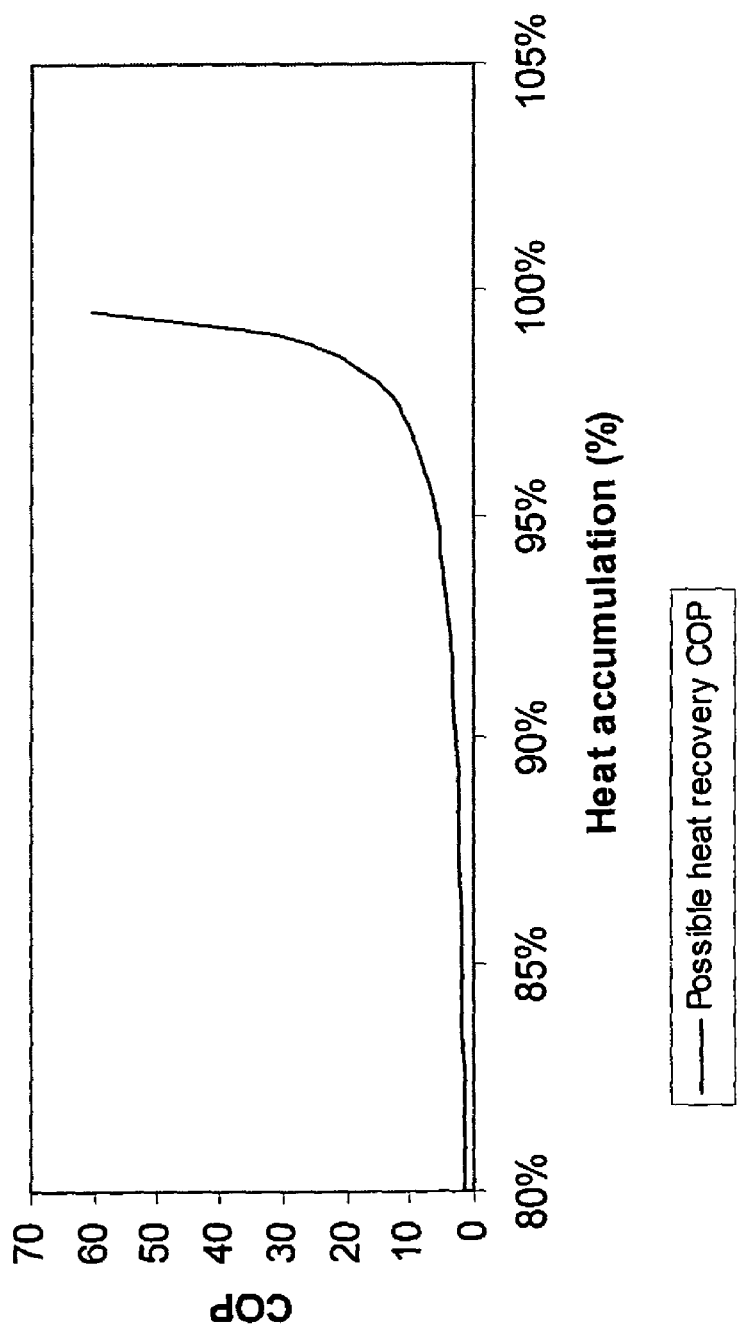
FIG. 3 is a graph plotting COP against Heat Accumulation (%) for tie system of FIG. 2.

Depending on the amount of heat recycled, the COP of the desorption chiller could be tither improved. FIG. 3 shows the variation in COP with the extent of accumulation of heat.

The apparatus described herein eliminated a set of valves and associated pipe work over that depicted in WO 2005/073644 (to the present applicant). The apparatus has less number of valves and moving parts, meaning less maintenance requirements as compared to earlier desorption cooler signs. It was also favourable for rung directly from the exhaust of a gas turbine, engine or boiler or solar energy.

This apparatus offered the possibility of a waste heat driven cooling system with the highest COP ever achieved. The COP of this system could be close to or higher than a conventional compression cycle system. That means the desorption cooler could also be efficiently and economically operated with electricity, providing further applications of the desorption cooling technology.

The symmetrical temperature gradient in the regenerator ensured a symmetrical gradient in the cooler side. This meant a higher degree of cooling with less fluctuation in the temperature was possible. There was also very little or no interruption in cold air production during the changeover.

The design also offered partial use of a cold stream to pre-cool the desorber chamber to a required temperature and deliver cooled air, for example, to be used in countries where the ambient temperature could be as high as 50° C.

EXAMPLE 3

Experimental Evidence of High COP from a Heat Driven Cooler

A number of experiments were conducted to prove the high COP with internal heat recovery in the present cooling system embodiment. Some of the important results can be summarised as follows:

1. During regeneration a very high quantity of latent heat of desorption was absorbed by the regenerator and thus the regenerator was able to be used as a heat sink to absorb heat.

Figure 4:
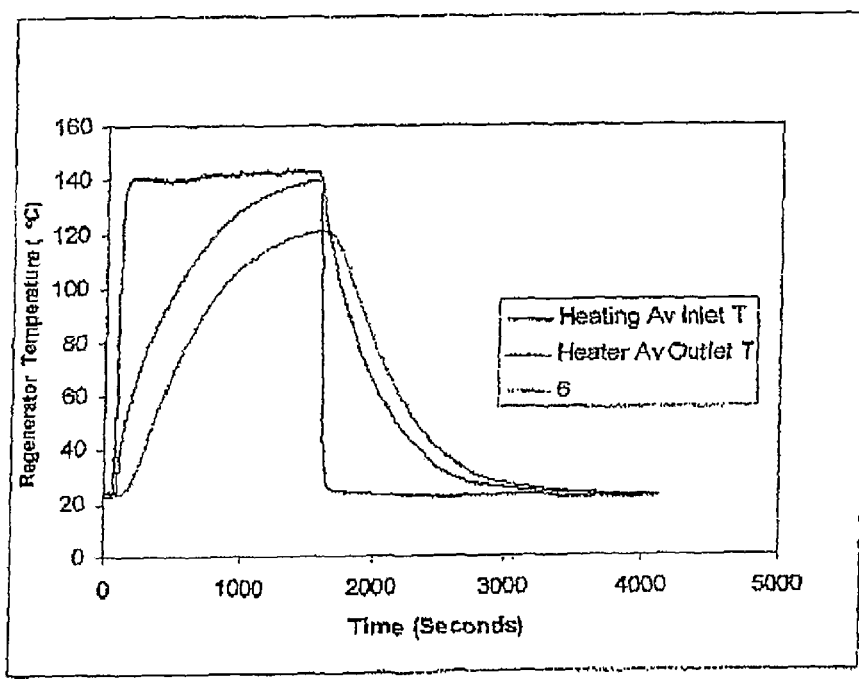

FIG. 4 is a plot of the Regenerator Temperature (° C.) vs Time (secs), showing a typical average temperature profile-of the beating air.

FIG. 5 is a plot of the Regenerator Temperature (° C.) vs Time (secs), showing the variation of the heating air temperature gradient across the regenerator with time at a superficial air velocity of 2 m/s.

2. During cooling, the regenerator was cooled (FIGS. 4 and 5).

FIG. 6 is a plot of the Regenerator Temperature (° C.) vs Time (secs), showing a typical average temperature profile of the cooling air.

FIG. 7 is a plot of the Regenerator Temperature (° C.) vs Time (secs), showing the temperature gradient of the cooling air across the cooler side with time at an air space velocity of about 2 m/s.

3. FIG. 8 is a plot of the Regenerator Temperature (° C.) vs Time (secs), showing the additional heat generated at the regenerator due to adsorption of fluid transferred after desorbing from the cooler side, which was heated by cooling the air passed through the cooler.

This effect was observed as a very low rise in temperature due to the heat absorbed at the cooler side. A low rise in temperature was expected due to the continuous air flow, which continuously removed heat from the regenerator. This effectively slowed down the cooling rate of the regenerator by transferring all recovered beat gained at the cooler to the regenerator. This her indicated that all heat from the regenerator plus that absorbed from the cooler was recovered at the regenerator.

Figure 9:
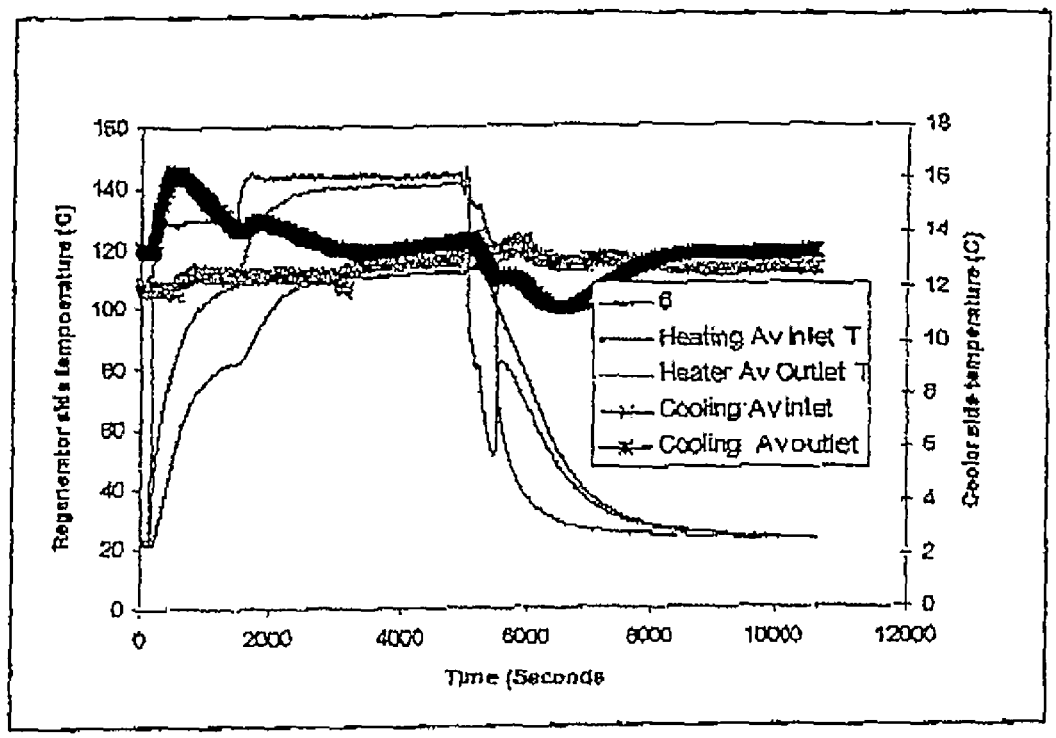

4. FIG. 9 is a plot of the Regenerator Temperature (° C.) vs Time (secs), showing the air exit temperature profile when the regenerator was cooled.

A higher quality heat was possible with the exit air, at a temperature slightly lower tan the regenerator's temperature. This result was also achieved with an existing laboratory unit, where the regenerator was allowed to lose heat until its electrical heater cooled down. In a scaled up commercial system the initial heater recovery would have higher temperature air.

5. Table 2 shows an energy balance based upon experimentally recorded temperature profiles and proves that a COP of 1 is possible if 74% of the heat is recovered.

Figure 10:
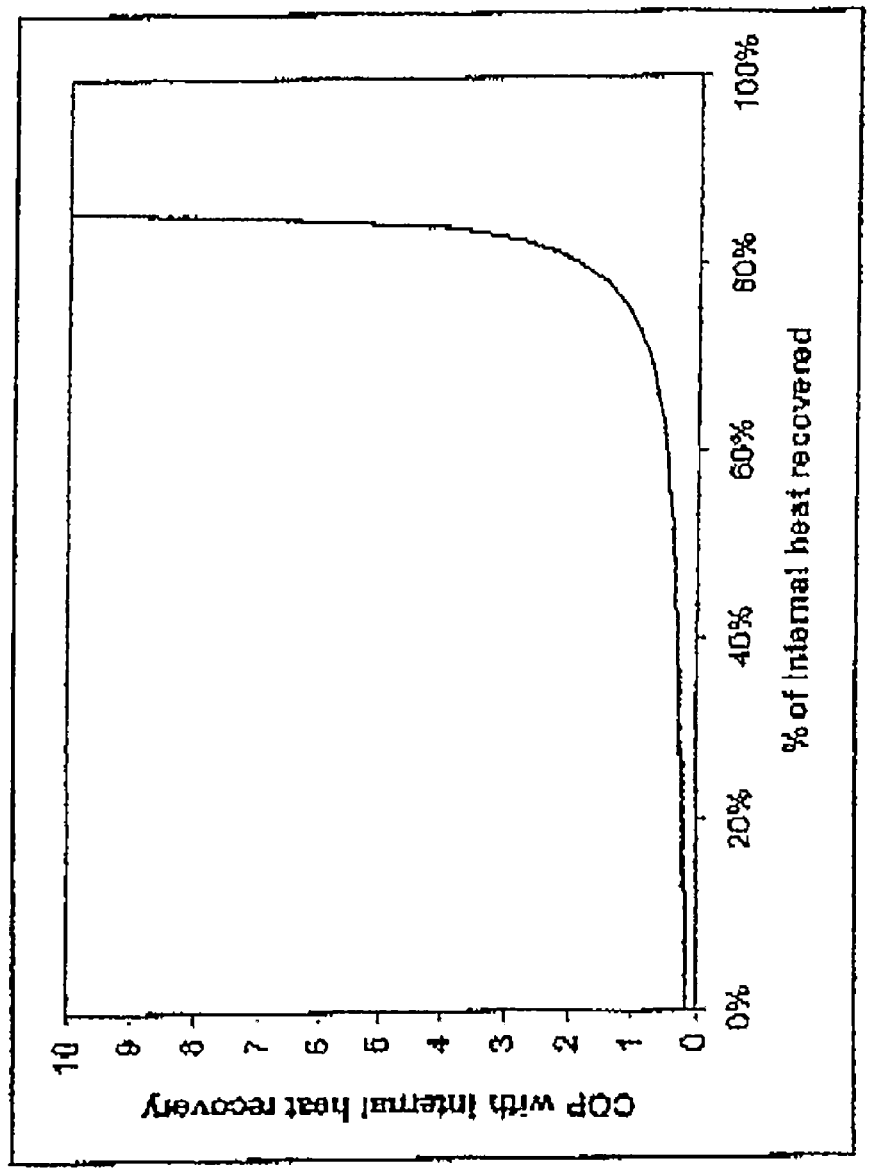
FIG. 10 is a graph plotting the Variation of COP against Internal Heat Recovered (%) for the system of FIG. 2.

FIG. 10 is a plot of COP vs % of IItemal Heat Recovered, showing the variation of COP with the heat recovery. The plot demonstrates that a higher COP of more than 10 is possible with a heat recovery of around 86%.

TABLE 2

| | Energy Balance and COP | |
|---|---|---|
| No. | Process step in a cycle | Result |
| 1 | Heat energy used for regeneration (J) | 6822 |
| 2 | Cooling energy produced by the cooler (J) | 1061 |
| 3 | COP without internal heat recovery | 0.1534 |
| 4 | Internal heat recovery (%) | 74 |
| 5 | COP estimated with heat recovery | 1.0 |

6. It was estimated that about 3079 modules would be needed for a 1 tonne cooler with high COP, having an approximate volume of 500 mm width×6500 mm length×1500 mm height. Other dimensions were possible and volume could be varied accordingly. For example the 6500 mm length was able to be reduced to a 2170 nm length by employing two bends.

7. It was noted that with such heat recovery options a greater number of shorter modules would be required to achieve a higher degree of cooling at a higher COP. These modules could be incorporated in appropriate chambers or even within duct shape chambers or existing ducts. It was noted that the effective size of the cooler could be very small if some of the tubes were incorporated into the duct work.

8. Even greater size reductions could be achieved with an optimisation of the materials of the module (and other components).

9. Using the system as shown in FIG. 2, and improved cooler design with a smart heat accumulative regeneration was able to be developed.

It is to be understood that the preceding description of specific apparatus and methods, and the preceding Examples, are provided for illustrative purposes only, and are not intended to limit the interpretation of scope in any way. Furthermore, it should be appreciated that various other changes and modifications can be made to the embodiments, in addition to those already described.

For example, whilst the heat exchange described and depicted is a shell and tube type, it could equally be a plate-frame type, heat pipe type etc. The heat exchanger used in the apparatus can also be much smaller due to potential for large heat recovery. No additional heat exchangers are required other than the exchanger integrated with the system.

It is to be further understood that references to prior art information herein do not constitute an admission that the information forms part of the common general knowledge in Australia or in any other country.

The invention claimed is:

1. Heat transfer apparatus comprising first and second heat transfer units, and a heat exchanger, the heat exchanger having a first portion thereof disposed between the first and second units, with a heat exchanger second portion being thermally connected to the first portion and being not disposed between the first and second units, wherein each unit comprises one or more modules, with each module comprising a chamber having a first part which contains a first gas adsorbent material and a second part which contains a second gas adsorbent material, with the parts being connected so as to allow gaseous communication therebetween whilst being relatively thermally isolated from each other.

2. Apparatus as claimed in claim 1 wherein the heat exchanger first portion is arranged between the module first part(s) of each unit, but is not so arranged between the module second part(s) of each unit.

3. Apparatus as claimed in claim 1 wherein the heat exchanger is of a shell and tube type, having a plurality of heat tubes extending in the shell, with the shell and tubes extending between the first and second portions to enable said thermal connection.

4. Apparatus as claimed in claim 3 wherein each tube houses a fluid to enhance the thermal connection between the second and first portions.

5. Apparatus as claimed in claim 3 wherein the heat exchanger comprises a partition within the shell that defines the first and second portions, but through which the tubes extend to enable said thermal connection.

6. Apparatus as claimed in claim 1 wherein each heat transfer unit comprises a plurality of modules, with each unit comprising a partition within the unit through which the modules extend such that the first part is located on one side of the unit partition and the second part is located on an opposite side of the unit partition.

7. Apparatus as claimed in claim 1 wherein the heat exchanger is adapted to receive a first fluid flow through the second portion but so as not to flow through the first portion, and wherein the apparatus is adapted to receive a working fluid flow through the first and second units, around the module first part(s) of each unit, and via the heat exchanger first portion, and is adapted to receive a second fluid flow through the first and second units, around the module second part(s) of each unit.

8. Apparatus as claimed in claim 7 wherein, when the first fluid is a relatively hot fluid, the apparatus can be operated such that the second fluid can be cooled as it flows around the module second part(s) of each unit.

9. Apparatus as claimed in claim 1 wherein the first and second parts of each module are joined by a section which is adapted to minimise conductive heat transfer between the first and second portions whilst allowing the continuous gaseous communication between the portions, the section being a conduit having a relatively smaller width than the width of the first and second chamber parts adjacent thereto.

10. Apparatus as claimed in claim 1 wherein the first and second materials are each packed into a respective module part, and wherein the first gas adsorbent material has a different adsorptivity to the second gas adsorbent material.

11. Apparatus as claimed in claim 1 wherein the first gas adsorbent material is a different material to the second gas adsorbent material, with the first gas adsorbent material being a zeolite, and the second gas adsorbent material being activated carbon.

12. Apparatus as claimed in claim 1 wherein each module chamber contains a gas that can adsorb onto and desorb from the first and second materials.

13. Apparatus as claimed in claim 12 wherein the gas is carbon dioxide pressurised relative to ambient pressure.

14. A method for transferring heat using the apparatus of claim 1, the method comprising the steps of:
   (i) passing a relatively hot fluid through the heat exchanger second portion whereby the thermal connection to the first portion causes heat to be transferred to the first portion;
   (ii) passing a relatively cooler first working fluid through the second unit and around the module first part(s) therein, then through the heat exchanger first portion to be heated up by the heat transferred thereto in (i), then through the first unit and around the module first part(s) therein, to heat those parts and cause gas adsorbed on the first material to desorb and flow to the module second part(s) in the first unit to adsorb onto the second material, the first working fluid then exiting the first unit;
   (iii) ceasing the flow of the first working fluid and passing another relatively cooler second working fluid through the first unit and around the module first part(s) therein to cool those part(s) and cause gas adsorbed on the second material to desorb and flow back to the module first part(s) in the first unit and adsorb back onto the first material;
   (iv) whilst passing the second working fluid through the first unit and causing said desorption in (iii), passing a first feed fluid through the first unit and around the module second part(s) therein, whereby the desorption of gas from the second material causes the first feed fluid to be cooled, which cooled fluid can then exit the first unit.

15. A method as claimed in claim 14 wherein in step (iii) after the second working fluid has passed around the module first part(s), it is then passed through the heat exchanger first portion to be heated up by the heat of step (i) that is being transferred thereto, and is passed through the second unit and around the module first part(s) therein, to heat those parts and cause gas adsorbed on the first material to desorb and flow to the module second part(s) in the second unit to adsorb onto the second material, with the second working fluid then exiting the second unit.

16. A method as claimed in claim 15 comprising the further steps of:
   (v) ceasing the flow of the second working fluid and passing the first working fluid through the second unit and around the module first part(s) therein to cool those part(s) and cause gas adsorbed on the second material to desorb and flow back to the module first part(s) in the second unit and adsorb back onto the first material;
   (vi) whilst passing the first working fluid through the second unit and causing said desorption in (v), passing a second feed fluid through the second unit and around the module second part(s) therein, whereby the desorption of gas from the second material causes the second feed fluid to be cooled, which cooled fluid can then exit the second unit.

17. A method as claimed in claim 16 wherein the first and second feed fluids are continuously passed through the first and second units.

18. A method as claimed in claim 17 wherein the first and second feed fluids exiting the first and second units are each passed to a respective entry of a four-way valve, the four-way valve further comprising both an exhaust port and a cooled fluid exhaust port whereby, over a given interval, the cooled fluid of the first and second feed fluids is caused to exit the cooled fluid exhaust port, and the non-cooled fluid of the second and first feed fluids is caused to exit the exhaust port, respectively.

19. A method as claimed in claim 14 wherein the passing of the relatively hot fluid through the heat exchanger second portion of step (i) is continuously maintained.

20. A method as claimed in claim 14 wherein the relatively hot fluid is a waste process gas or liquid.

21. A method as claimed in claim 14 wherein each of the first and second working fluids, and first and second feed fluids is ambient air.

* * * * *